Figure 1:
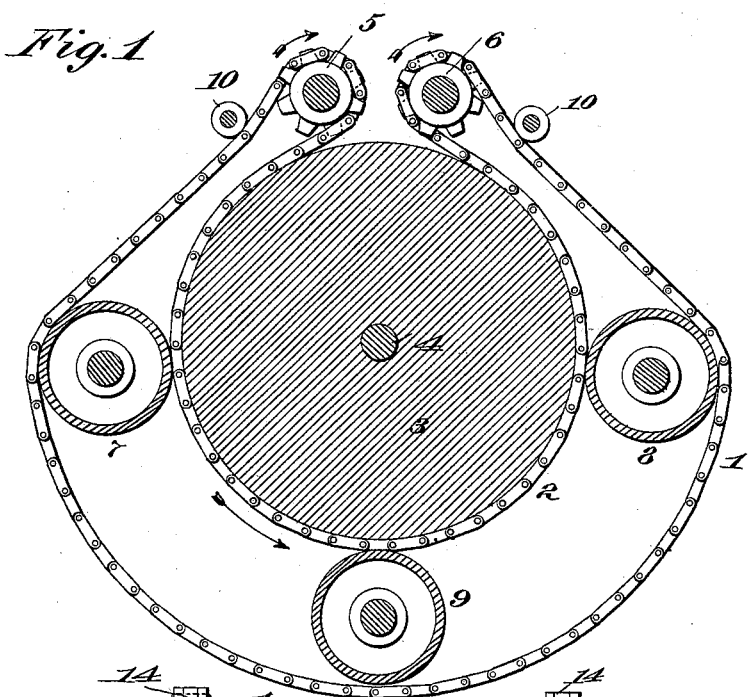

(No Model.) 4 Sheets—Sheet 1.

F. L. DYER.
COTTON PRESS.

No. 591,334. Patented Oct. 5, 1897.

Witnesses.
J. N. Coleman
Archie G. Reese

Inventor
Frank L. Dyer

THE NORRIS PETERS CO., PHOTO-LITHO., WASHINGTON, D. C.

(No Model.) 4 Sheets—Sheet 2.

F. L. DYER.
COTTON PRESS.

No. 591,334. Patented Oct. 5, 1897.

Witnesses.

Inventor
Frank L. Dyer (No Model.) 4 Sheets—Sheet 3.

F. L. DYER.
COTTON PRESS.

No. 591,334. Patented Oct. 5, 1897.

Witnesses.
J. F. Coleman
Archie G. Reese

Inventor
Frank L. Dyer (No Model.)  4 Sheets—Sheet 4.

F. L. DYER.
COTTON PRESS.

No. 591,334.  Patented Oct. 5, 1897.

Witnesses.

Inventor

UNITED STATES PATENT OFFICE.

FRANK L. DYER, OF WASHINGTON, DISTRICT OF COLUMBIA, ASSIGNOR TO THE AMERICAN COTTON COMPANY, OF NEW YORK, N. Y.

COTTON-PRESS.

SPECIFICATION forming part of Letters Patent No. 591,334, dated October 5, 1897.

Application filed January 3, 1896. Serial No. 574,231. (No model.)

*To all whom it may concern:*

Be it known that I, FRANK L. DYER, a citizen of the United States, residing at Washington, in the District of Columbia, have invented certain new and useful Improvements in Cotton-Presses, (Case No. 22,) of which the following is a full, clear, and exact description.

The cotton-presses to which my invention relates are those which are designed for making cylindrical bales, and the specific type of those presses to which the invention has especial reference is that invented by John W. Graves and described and claimed in Letters Patent of the United States, dated December 3, 1893, Nos. 510,385, 510,386, 510,387, and 510,388. The distinguishing feature of the Graves press is an endless belt a portion of which is formed into a loop or bight wherein the bale is gradually accumulated by the spiral winding of a continuous sheet or bat of cotton upon a core stationed in said loop or bight, the bale being at the same time subjected to pressure imposed by the belt. In order to impose the requisite tension on the belt to effect the pressing of the bale, a tension-roller is employed mounted in said belt, and to which a weight or similar device is connected. It has been found from actual experience that a belt made of steel links is preferable to any other form of belt. A cotton-press of the Graves type is of especial advantage in practical use, for the reason that most of the surface of the bale is at all times subjected to pressure, whereas in the different forms of roller-presses which succeeded the original invention of Graves the bale is subjected to pressure at only a small portion of its surface, and therefore the bale tends to expand at its portions which are not subjected to pressure, so that not only is the diameter of the bale limited, but toward the end of its operation it is liable to be more or less fluffy. The principal objection to the use of a belt as described by Graves is that the constant movement of the links of the belt in passing over the various supporting-rollers and around the bale while the belt is subjected to great tension tends to quickly wear out the belt, so as to destroy its usefulness.

What I aim to accomplish by means of my present invention is to reduce to a large extent the liability of the belt to wear, so that its life is increased.

Another aim I have in view is to make the press lighter than is possible when the ideas suggested by Graves are carried out.

Another object which I attain in my present invention is to reduce the power necessary to drive the press in the manufacture of the bales.

The broad principle underlying the invention which I have made is the subjection of the belt to tension only for a portion of its length and preferably at that portion thereof which surrounds the bale, the remaining portion of the belt not being subjected to any strains. In this way there will be much less wear of the links of the belt than in the Graves press, for although there may be just as much movement of the links yet many of these movements occur where there is no strain other than the weight of the belt. For this reason the life of the belt will be correspondingly prolonged. In the case of a leather belt the life thereof will be prolonged for the reason that only a portion of the belt is subjected to tension at one time, whereas in the Graves press the entire belt is always subjected to tension. As a necessary consequence to this improvement I am enabled to operate the press with less power for the reason that the belt does not have to be driven over a number of supporting-rollers, as in the Graves press, while it is subjected to the necessarily great tension. Similarly as a consequence to the improvement which I have made I am enabled to make the press considerably lighter, since the strains which are imposed therein occur only in its portions immediately adjacent to the bale. Furthermore, since only a portion of the belt is subjected to pressure at a time it becomes possible to lubricate the belt and thereby further prolong its life. With the Graves press it is not possible to lubricate the belt, since the constant strains on the belt forces the moving parts thereof tightly together and at all times holds them tightly together, and any lubricant which may be introduced between the wearing parts will be forced from between the wearing parts. With my press the wearing parts for more than half of the time (when tension is applied only to the loop or bight) are not subjected to pressure, and therefore the lubricant has the opportunity of flowing between the wearing parts, so that when the strain is imposed on said parts they will be effectively lubricated. I consider this a very important point and wish to lay especial stress on it. In the Graves press two rollers are employed, which support the endless belt and below which the the loop or bight is formed, the space between said rollers constituting the entrance to the loop or bight and through which the sheet or bat of cotton is introduced. In that press one of those rollers is provided with means for driving the belt, being in the case of a link-belt provided with sprocket-teeth which engage with the openings between the links, so as to positively drive the belt. In case of a belt made of leather, rubber, or textile material that roller is provided above it with a pressure-roller which presses the belt down upon it, so as to tightly grip the belt and thereby enable the belt to be driven. In either case the other roller at the entrance of the loop or bight of the belt serves simply as a supporting-roller for the belt and does not drive the belt.

In order that the principle underlying my invention may be understood, let it be assumed that both of these rollers are positively connected with the belt, that to one of these rollers the necessary power is applied, and that to the other of said rollers a brake device or retarding device is applied. It will now be seen that when power is applied to the press so as to drive the belt said brake or retarding device will act as a drag on the belt, so that as the bale is formed within the loop or bight it will be subjected to a pressure due entirely to the power applied to the press, said pressure depending on the amount of resistance imposed on the belt. Such a press would, however, be objectionable because great power would be required to operate it. It is obvious that a press wherein this principle might be carried out without the objection of absorbing power from the operating-engine for compressing the bale would be far superior. Such a press might, therefore, be made in theory by positively driving both rollers at the entrance to the loop or bight of the belt, one roller revolving slightly faster than the other roller, so that the belt would slowly sag or accumulate between said rollers. If, therefore, a sheet or bat of cotton could be fed to the press with the proper regularity to exactly compensate for the sagging of the belt, or, in other words, to exactly compensate for the enlargement of the loop or bight to thereby produce a bale of the proper density, a theoretically-perfect press would be produced. In practice, however, it would be extremely difficult, if not impossible, to feed the sheet or bat of cotton to such a press in such a perfect manner that a bale of exactly the proper density would be produced, and it will be seen that if the cotton were fed too slowly into the press the bale would be of less than the requisite density, whereas if too much cotton were fed into the press the bale would be of too great a density and the belt would be liable to be broken. In order, therefore, to produce a press embodying my present invention which will be perfect in practical operation, I prefer to positively drive both of the rolls at the entrance to the loop or bight of the belt, and I prefer to provide a differential mechanism by means of which the back roll will be driven slightly faster than the front roll, such difference in speed being such that under all circumstances a bale of the proper density will be produced. At the same time I subject that portion of the belt surrounding the bale only to pressure and obtain the consequent advantages before referred to.

Another part of my present invention is the provision of means in a press of the Graves type employing a single belt whereby two or more bales may be simultaneously made in the same press, and although the belt will necessarily have to be made somewhat longer than when a single bale is produced the increase in length is not so great as would be required in two or more separate presses each making a single bale, as is now the case. Similarly the increase in weight and cost of such a press is not so great as with separate presses each making a single bale and of the same aggregate capacity. In such a press, moreover, the belt is not subjected to any greater tension than in an ordinary Graves press for making a single bale. Therefore when both parts of my present invention are carried out in a single structure I produce a press of less cost and weight, of greater capacity and durability, and requiring less power to operate it than with any press of the Graves type heretofore made.

It is of course understood that the two parts of my present invention are not dependent one on the other, and each may be carried out in practice independent of the other, with the resulting advantage before pointed out.

In the accompanying drawings I show ways for the carrying out of my invention which are capable of practical operation, but to which I am not to be limited except in the specific claims made thereon.

Figure 2:
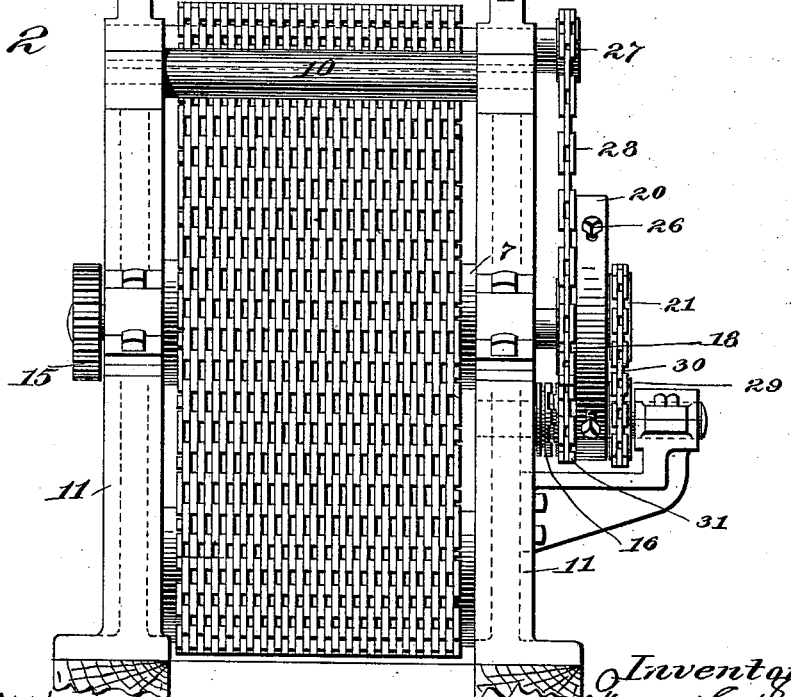
Figure 3:
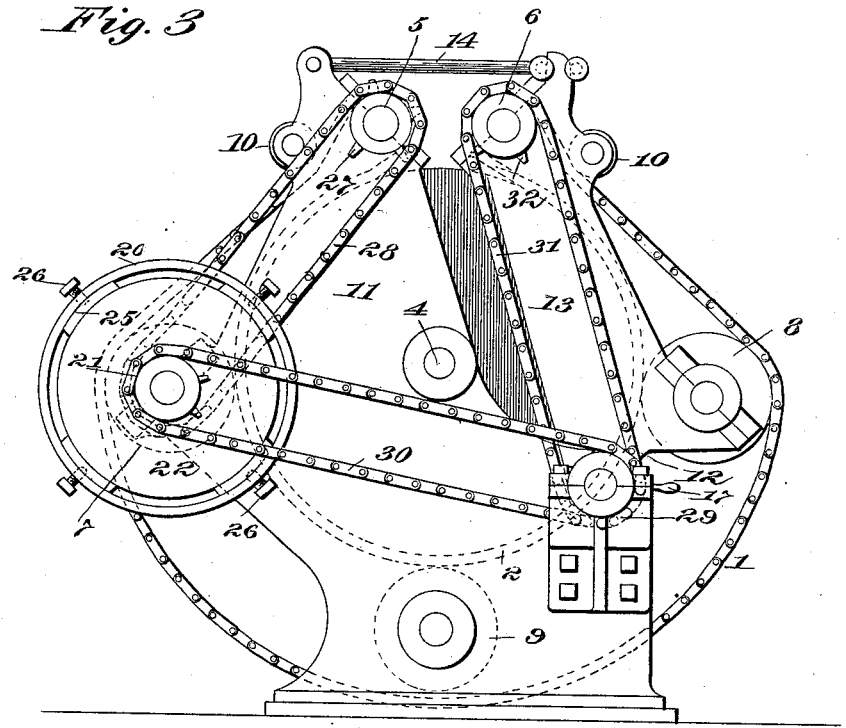
Figure 4:
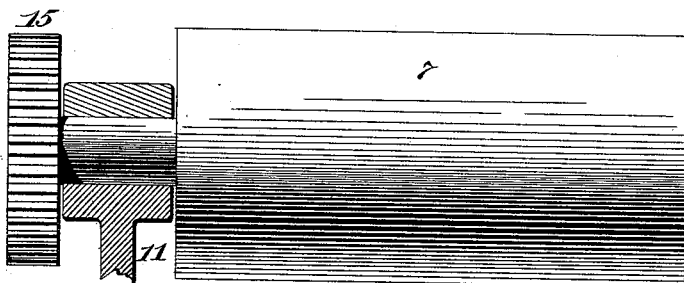
Figure 4:
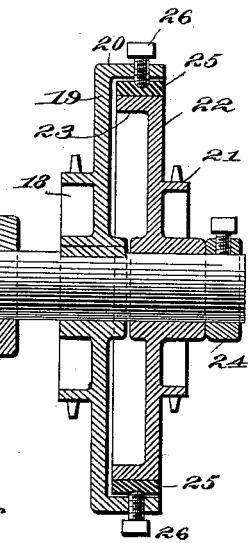
Figure 5:
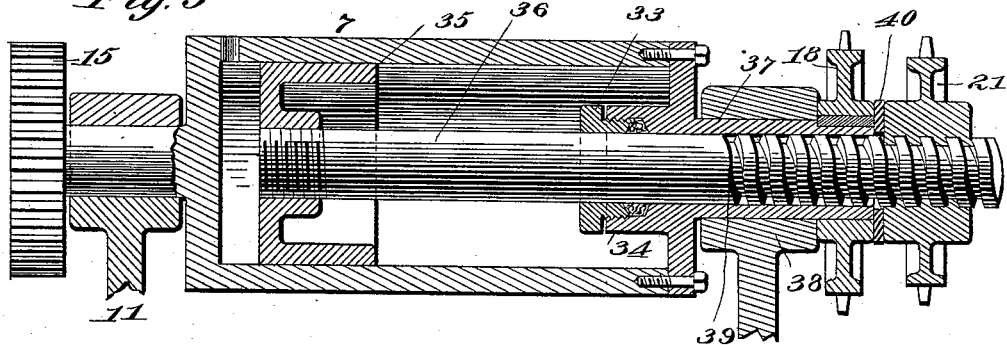
Figure 6:
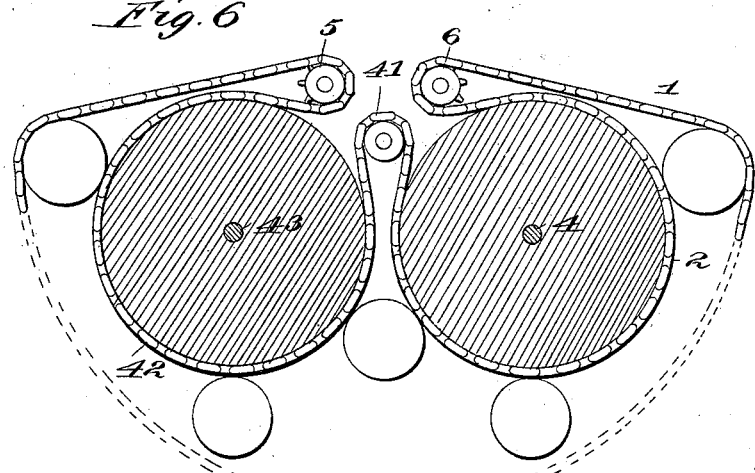
Figure 7:
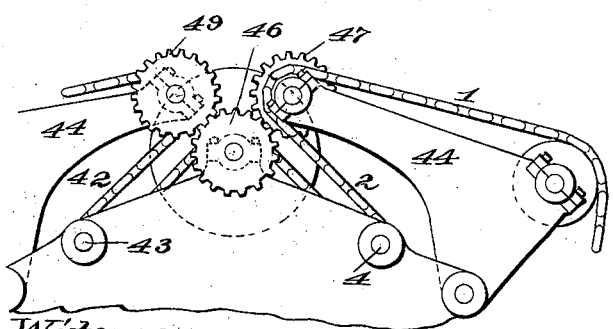
Figure 8:
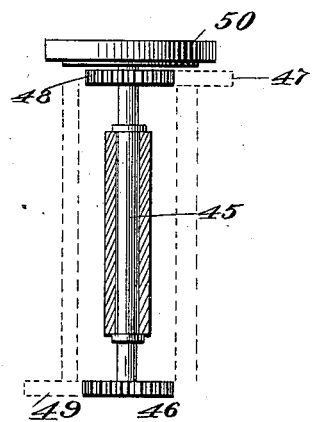
Figure 9:
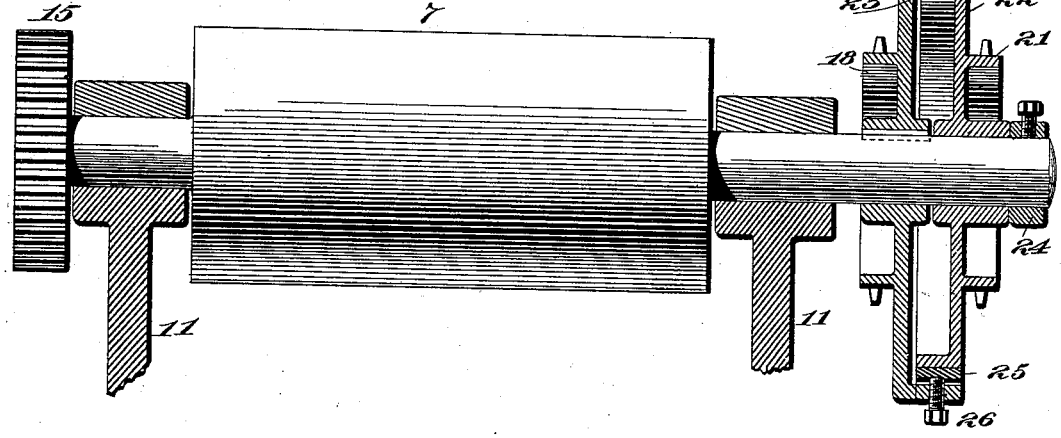
Figure 10:
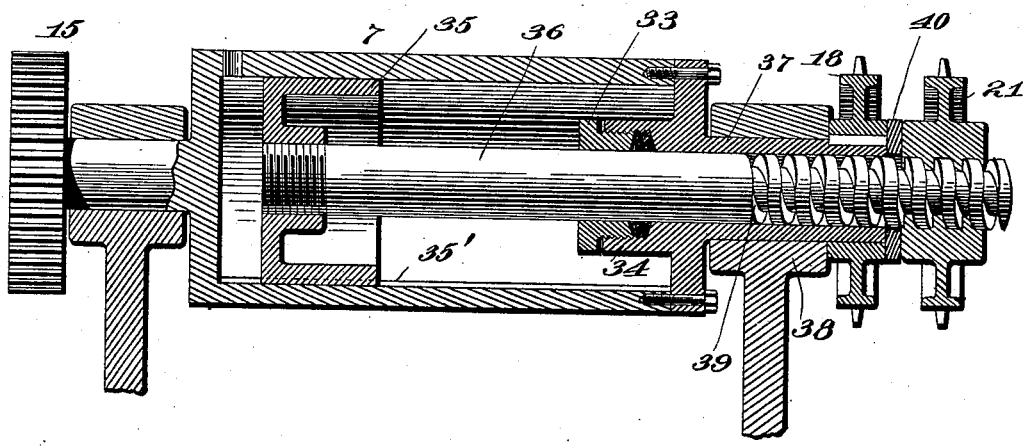

In the drawings, Figure 1 is a diagrammatic sectional view of a convenient arrangement of the belt and supporting and driving rollers, illustrating the general principles of the improvement for applying tension in the loop or bight only; Fig. 2, a rear elevation of a convenient form of press embodying those principles; Fig. 3, a side elevation of the same; Fig. 4, a detail view of the compensating device shown in Figs. 2 and 3; Fig. 5, a modified form of compensating device employing an air-cylinder; Fig. 6, a diagrammatic sectional view of a convenient form of press for making two bales simultaneously; Fig. 7, an elevation of the upper portion of the same;

Fig. 8, a detail sectional view; and Figs. 9 and 10 are views corresponding to Figs. 4 and 5, differing therefrom in a minor particular, which will be pointed out.

In all of the above views corresponding parts are represented by the same numerals.

Having reference now to Fig. 1, 1 represents an endless belt, shown in this instance as consisting of steel links and formed into a loop or bight 2, in which the bale 3 is formed by the winding of a continuous sheet or bat of cotton on a core 4. The core may, however, be dispensed with. 5 and 6 are rollers stationed at the entrance to said loop or bight and over which the belt 1 passes, said rollers in this instance being provided with sprocket-teeth which engage with the belt, so that the belt is positively connected to said rollers. When a leather or other similar belt is used, means are to be provided for engaging the belt with the rollers 5 and 6—such, for instance, as a pressure-roller mounted above each of said rollers and pressing the belt tightly upon them. 7 and 8 are other rollers over which the belt 1 passes and which are adapted to be engaged by the loop or bight 2 when the bale has reached its maximum size. 9 is an idler for supporting the bale when it has reached its maximum size. These rollers 7, 8, and 9 may be dispensed with or differently arranged without affecting the present invention, which relates, broadly, to the means for effecting tension on a portion of the belt, such as the loop or bight of the belt alone, instead of for its entire length, as in the Graves press. 10 10 are small rollers for keeping the belt 1 in engagement with the sprocket-wheels 5 and 6, but said rollers 10 may be dispensed with. Arrows on the figure indicate the direction of movement of the parts.

In order that the general principles underlying my present invention may be understood, let it be assumed that power is applied to the roller 6 and that a brake or other retarding device is applied to the roller 5. When the belt is therefore driven by the roller 6, the brake or retarding device attached to the roller 5 acts as a drag on the belt, whereby pressure is applied within the loop or bight thereof, so as to compress the bale, said pressure depending entirely upon the amount of resistance imposed on the roller 5. While such a press would be operative and, in case of unlimited power being at hand, might be desirable, it will be seen that it would be objectionable in ordinary use, since a large proportion of the power would be required to effect the pressure on the bale. In order that this objection might be overcome, let it be assumed that both of the rollers 5 and 6 are positively driven by the engine, but that the roller 5 is caused to revolve slightly faster than the roller 6. In this way the loop or bight 2, which at the starting of the bale is up against the core 4 when used, would commence to slowly sag downward or enlarge. If, therefore, a sheet or bat of cotton could be so fed into the press as to exactly compensate for this sagging or enlargement of the loop or bight, and to thereby produce a bale of the requisite density, a theoretically-perfect press would be produced. It will be seen, however, that in practice it would be difficult, if not impossible, to feed the cotton into the press at exactly the proper speed and quantity, and if the cotton were fed too slowly a bale of less than the desired density would result, whereas if it was fed too fast into the press the belt would be unnecessarily strained and a bale of too great a density would be produced. In order, therefore, that the invention may be carried out in practice, I consider it desirable to positively drive the rollers 5 and 6 and to apply a differential connection between them of such a character that the speed of the roller 5 with respect to the roller 6 will increase exactly in proportion to the cotton coming into the press, so that under all circumstances a bale of exactly the proper density will be produced.

In Figs. 2, 3, 4, 5, 9, and 10 I illustrate a practical means whereby the principles I have above outlined may be carried out. Referring particularly to these figures, 11 11 represent suitable side frames which are strengthened and braced in the proper manner. Mounted in a heavy joint 12 in each side frame is a swinging supporting-arm 13, said arms carrying roller 6 at their upper ends. The roller 8, over which the belt 1 passes, is also carried in said supporting-arms. These supporting-arms may be swung downward so as to open the loop or bight for the removal of the completed bale, as is described in said Graves patents referred to. 14 is a heavy latch at each side of the press for locking the swinging arms 13 in their elevated position. The sprocket-roller 5 and the rollers 7 and 9 are mounted in suitable bearings in the side frames 11, as is also the core 4 when used. In the present instance of my invention power is applied to the gear-wheel 15, mounted on the shaft of the roller 7, as shown particularly in Fig. 4. 18 is a sprocket-wheel made integral with the enlarged face-wheel 19, having a turned-over rim 20 and keyed to the shaft of the roller 7. 21 is another sprocket-wheel made integral with the face-wheel 22, having a rim 23 located inside of the rim 20 of the face-wheel 19, said sprocket-wheel 21 turning loosely upon the shaft of the roller 7. A collar 24, secured to said shaft, keeps the sprocket-wheel 21 in place. Between the sprocket-wheels 18 and 21 is interposed a differential connection, by means of which the roller 5 will be allowed to revolve slightly faster than the roller 6, such difference in speed, as before stated, depending upon the amount of cotton fed into the press. In the present instance this differential connection is an ordinary brake device, consisting of a number of brake-shoes or buffers 25, made of wood or other elastic material and carried on adjusting-screws 26 in the rim 20 of the face-wheel 19, said buffers or shoes bearing upon the rim 23 with the necessary amount of friction. The sprocket-wheel 18 connects with the sprocket-wheel 27, formed on the shaft of the roller 5 by means of a sprocket-chain 28, so as to drive said roller. The sprocket-wheel 21 connects with an idler 29, mounted coincidently with the joint of the swinging arms 13, by means of a sprocket-chain 30. Revolving with said idler 29 is another sprocket-wheel of the same size, which connects by means of the sprocket-chain 31 with the sprocket-wheel 32, mounted on the shaft of the roller 6 so as to drive the latter. Preferably I interpose between the idler 29 and its companion a clutch 16, operated by a lever 17, by means of which said sprocket-wheels may be connected and disconnected when necessary. For the purpose of clearness I illustrate sprocket-wheels and chains for driving the rollers 5 and 6, but in practice I would prefer to employ gear-wheels for this purpose, since the strains to which said chain would be subjected in practice would render their use impracticable.

The operation of the press, which I have briefly described, will be readily understood. In the starting of the bale the loop or bight 2 of the belt is up against the core 4 when used. Power is now applied to the press so as to drive the roller 7 and sprocket-wheel 18, and by means of the friction connection between the sprocket-wheel 18 and the sprocket-wheel 21 the latter will be driven therewith at the same speed. From these sprocket-wheels 18 and 21 the rollers 5 and 6 are driven so as to drive the belt in the proper direction. Cotton is now fed into the space between the rollers 5 and 6 and, entering the loop or bight, commences to wind convolutionally around the core 4 when used. The gradual accumulation of this cotton within the loop or bight causes the loop or bight to enlarge, or, in other words, it causes the roller 5 to move faster than the roller 6. This increase of speed is allowed for by reason of the differential connection between the sprocket-wheels 18 and 21, for it will be seen that when the tendency of the loop or bight to enlarge has become sufficiently great to overcome the friction between the buffers or shoes 25 and the rim 23 of the face-wheel 22 the face-wheels 19 and 22 will move relatively to each other and allow the roller 5 to move faster than the roller 6, whereby the loop or bight will commence to slowly enlarge with the accumulated cotton. This operation is continued until the bale has been formed. After the bale has been formed the swinging arms 13 are moved downward, as described in the Graves patents, and the core having been removed either from the bale or from the machine the finished bale is removed. By now operating the lever 17 so as to disconnect the sprocket-wheel 29 from its companion the roller 6 will be free to turn and the weight of the belt 1 below the press will close up the loop or bight for the starting of a new bale. It will be seen that with the press described the belt is subjected only to pressure in its portion extending from the roller 5 around the bale to the roller 6, the greater portion of the belt outside of the machine not being subjected to pressure at all. In this way the life of the belt will be very much increased, as will be understood, it being a fact that in the Graves press the entire portion of the belt is at all times subjected to pressure. In such a press also much less power is required to drive the belt, for the reason that it is not necessary to drive the belt over a number of supporting-rollers while it is subjected to great tension, as in the Graves press. In practice it is desirable that the pressure applied to the belt should gradually increase as the bale enlarges, so that the pressure per square inch on the bale will remain practically constant. It is a matter of mechanical skill alone to make a friction device having this capacity—for instance, by causing the screw 26 to be slowly rotated to force the buffers or shoes 25 more tightly against the rim 23.

In Fig. 5 I show another way for the carrying out of my invention wherein the tension on the belt will be automatically increased as the bale enlarges and wherein, instead of the friction device between the rollers 5 and 6, I employ a pneumatic cylinder. In this figure the roller 7 is a cylinder having a removable head 33, in which is a packing 34 inside of the cylinder. 35 is a piston in the cylinder connected with the piston-rod 36, which extends through the packing 34 and through a sleeve 37, which engages with the bearing 38 in one of the side frames 11. In this form the sprocket-wheel 18 is keyed directly to said sleeve 37, and the sprocket-wheel 21 is mounted upon the piston-rod 36, said piston-rod being screw-threaded at 39, as shown, with which screw-threads the hub of the sprocket-wheel 21 engages. 40 is a collar of antifriction metal between the friction-wheels 18 and 21. The operation of this modification will be readily understood. Power being applied to the gear-wheel 15 to drive the cylinder-roller 7 the sprocket-wheels 18 and 21 will be driven with it, so as to rotate the rollers 5 and 6. When, however, the loop or bight enlarges so as to cause the roller 5 to rotate faster than the roller 6, the sprocket-wheel 21 will move relatively to the sprocket-wheel 18, so as to gradually withdraw the piston-rod 36 from the cylinder-roller 7 and move the piston 35 therein, so as to compress the air inside of said cylinder. As this movement progresses the air inside of the cylinder becomes more and more compressed, so that the tension on the loop or bight is automatically increased. It is of course obvious that provision should be made for preventing the piston 35 from turning within the cylinder 7, such as by means of a key 35' in Fig. 10, and it is apparent that instead of the pneumatic cylinder a hydraulic cylinder may be used. In practice I prefer to drive the roller 5 slightly faster than the roller 6, and at the same time to employ a differential connection between said rollers. The increase in speed of the roller 5 with respect to the roller 6 when it is thus normally driven should be so regulated as to be slightly less than is required to accommodate the normal supply of cotton to the press, so that the differential connection between the rollers in addition will be operated. In this way I allow for the proper compression of the bale and at the same time reduce the wear of the friction shoes or buffers 25 on the rim 23. This effect may be carried out, for instance, by making the sprocket-wheel 18 slightly larger than the sprocket-wheel 21, as shown particularly in Fig. 4. In this figure I have purposely exaggerated the difference in size between the sprocket-wheels in order that the difference may be apparent to the reader. It will be understood, of course, that the rollers 5 and 6 may be driven normally at the same speed and that the entire enlargement of the loop or bight may thereby be accommodated by the differential mechanism, in which case the sprocket-wheels 18 and 21 will be of the same size as in Figs. 9 and 10.

In Figs. 6, 7, and 8 I illustrate the second portion of my invention, by means of which I am enabled to make two or more bales in a single press. In these figures I illustrate a convenient arrangement of the parts of the press for the simultaneous formation of two bales. Referring particularly to Fig. 6, I pass the belt 1 over the roller 6, then downward around a core 4 into the loop or bight 2, then over an idler 41, carried in the main frame of the machine, then downward into a loop or bight 42 around a core 43, then up and over the roller 5, so that said belt is formed into two loops or bights. In this part of my invention tension may be applied to the belt by means of a weighted box, as described by Graves, or by a friction brake or cylinder, its entire length being subjected to pressure. I prefer, however, to supply this tension to the belt 1 in its portion surrounding the two bales being formed, as I have before described. In order that this may be done, I carry the rollers 5 and 6 each in swinging arms 44 44, mounted in the press so as to swing downwardly for the removal of the two bales. The idler 41 turns loosely on a shaft 45, (see Fig. 8,) and said shaft is driven in any suitable way. 46 is a gear-wheel keyed to one end of said shaft and meshing with a gear-wheel 47, which positively drives the roller 6. 48 is a gear-wheel loosely mounted on said shaft near its other end and meshing with the gear-wheel 49, which drives the roller 5. 50 represents a differential connection, such as that shown in Fig. 4, for driving the gear-wheel 48 from the shaft 45 and at the same time allowing for the increase of speed of the roller 5 with respect to the rollers 6, as will be understood. In this form of press I am enabled to form two or more bales at the same time in a single machine, and although the belt will have to be made necessarily somewhat longer the increase in length will not be so great as would be required in two or more separate presses each making a single bale. Similarly the increase in weight and cost is not so great as in a number of presses having the same aggregate capacity and each forming a single bale. Furthermore, the tension on the belt is no greater than when a single bale is formed, although, of course, the amount of its surface subjected to tension is twice as great as in the press shown in Figs. 1, 2, 3, 4, and 5. When the two loops or bights are arranged as I have shown them, with the entrances thereto adjacent to each other, the cotton may be fed to the same by means of two endless traveling aprons mounted one above the other and each receiving a sheet or bat from a separate condenser, as will be understood. By driving the rollers 5 and 6 from a single shaft located between them when the swinging arms are moved downward to allow for the expulsion of the bale the tension will be simultaneously removed from the belt, so that after the bales have been removed the belt will automatically be moved up against the cores for the formation of new bales.

Before claiming my invention I desire to have it understood that the two parts of my invention herein described, while being well adapted for use in a single structure, are nevertheless entirely independent of each other and may be carried out in different structures with the resulting advantages due to each part.

I desire to have it also understood that the invention is capable of being used for the compressing of other materials besides cotton, and in the case of a material having a determined and even thickness it will be possible to employ a positive driving means between the rollers for allowing the loop or bight of the belt to gradually enlarge, in that case the differential connections between them being dispensed with.

It is also to be understood that the same principles I have described for the making of two bales in the same press can be employed for making any desired number of bales.

Having now described my invention, what I claim as new, and desire to secure by Letters Patent, is as follows:

1. In a press for forming sheets of cotton and other materials into cylindrical bales, the combination of a belt, a portion of which is formed into a loop or bight which partially surrounds the bale during its formation, and means stationed at the entrance of said loop or bight for resisting the enlargement of said loop or bight, substantially as set forth.

2. In a press for forming sheets of cotton and other materials into cylindrical bales, the combination of a belt, a portion of which is formed into a loop or bight, two rollers to which said belt is positively connected, means for driving said belt, and means for rotating one of said rollers faster than the other of said rollers, substantially as set forth.

3. In a press for forming sheets of cotton and other materials into cylindrical bales, the combination of an endless belt, a portion of which is formed into a loop or bight which partially surrounds the bale during its formation, and means for applying tension to a portion only of said belt, so that the remaining portion of said belt will not be under tension, substantially as set forth.

4. In a press for forming sheets of cotton and other materials into cylindrical bales, the combination of an endless belt, a portion of which is formed into a loop or bight which partially surrounds the bale during its formation, and means stationed at the entrance of said loop or bight for resisting the enlargement of said loop or bight, substantially as set forth.

5. In a press for forming sheets of cotton and other materials into cylindrical bales, the combination of an endless belt, a portion of which is formed into a loop or bight, two rollers to which said belt is positively connected, means for driving said belt, means for allowing one of said rollers to rotate faster than the other of said rollers, and means for resisting the rotation of one of said rollers with respect to the other, substantially as set forth.

6. In a press for forming sheets of cotton and other materials into cylindrical bales, the combination of an endless belt, two rollers to which said belt is positively connected and between which the belt is formed into a loop or bight, and means for driving one of said rollers faster than the other of said rollers, whereby said belt will be driven and said loop or bight will enlarge with the bale, substantially as set forth.

7. In a press for forming sheets of cotton and other materials into cylindrical bales, the combination of two supporting-rollers over which passes an endless belt, a portion of which is formed into a loop or bight, the space between said supporting-rollers constituting the entrance to said loop or bight, and means for driving one of said rolls faster than the other of said rollers, substantially as set forth.

8. In a press for forming sheets of cotton and other materials into cylindrical bales, the combination of two supporting-rollers over which passes an endless belt, a portion of which is formed into a loop or bight, the space between said rollers constituting the entrance to said loop or bight, means for positively driving said rollers, and differential connections between said rollers for allowing one of said rollers to rotate faster than the other of said rollers, as said loop or bight enlarges with the bale, substantially as set forth.

9. In a press for forming sheets of cotton and other materials into cylindrical bales, the combination of two supporting-rollers over which passes an endless belt a portion of which is formed into a loop or bight, the space between said rollers constituting the entrance to said loop or bight, means for driving one of said rollers faster than the other of said rollers, and differential connections between said rollers for allowing one of said rollers to move independent of the other of said rollers, substantially as set forth.

10. In a press for forming sheets of cotton and other materials into cylindrical bales, the combination of an endless belt, a portion of which is formed into a loop or bight which partially surrounds the bale during its formation, and means stationed at the entrance of said loop or bight for resisting the enlargement of said loop or bight, said resistance gradually increasing as the loop or bight enlarges, substantially as set forth.

11. In a press for forming sheets of cotton and other materials into cylindrical bales, the combination of an endless belt, two rollers to which said belt is positively connected and between which the belt is formed into a loop or bight, means for driving said belt, and a friction device between said rollers for allowing one of them to rotate independent of the other as the loop or bight enlarges, substantially as set forth.

12. In a press for forming sheets of cotton and other materials into cylindrical bales, the combination of an endless belt, two rollers to which said belt is positively connected and between which the belt is formed into a loop or bight, means for driving said rollers whereby the belt will be driven, and a friction device between said rollers for allowing one of them to rotate independent of the other, whereby said loop or bight will be gradually enlarged, substantially as set forth.

13. In a press for forming sheets of cotton and other materials into cylindrical bales, the combination of an endless belt, a portion of which is formed into a loop or bight which partially surrounds the bale during its formation, a core stationed in said loop or bight on which the bale is formed, and means stationed at the entrance of said loop or bight for resisting the enlargement of said loop or bight, substantially as set forth.

14. In a press for forming sheets of cotton and other materials into cylindrical bales, the combination of an endless belt, a portion of which is formed into a loop or bight, a core stationed in said loop or bight on which the bale is formed, two rollers to which said belt is positively connected, means for driving said belt, means for allowing one of said rollers to rotate faster than the other of said rollers and means for resisting the rotation of one of said rollers with respect to the other, substantially as set forth.

15. In a press for forming sheets of cotton and other materials into cylindrical bales, the combination of an endless belt, a portion of which is formed into a loop or bight, a core stationed in said loop or bight on which the bale is formed, two rollers to which said belt is positively connected and between which the loop or bight is formed, and means for driving one of said rollers faster than the other of said rollers, whereby said belt will be driven and said loop or bight will enlarge with the bale, substantially as set forth.

16. In a press for forming sheets of cotton and other materials into cylindrical bales, the combination of an endless belt, a portion of which is formed into a loop or bight which surrounds the bale during its formation, a core stationed in said loop or bight on which the bale is formed, and means stationed at the entrance of said loop or bight for resisting the enlargement of said loop or bight, said resistance increasing as the loop or bight enlarges, substantially as set forth.

17. In a press for forming sheets of cotton and other materials into cylindrical bales, the combination of an endless belt, a portion of which is formed into a loop or bight, a core stationed in said loop or bight on which the bale is formed, two rollers to which said belt is positively connected, and between which the loop or bight is formed, means for driving said belt, and a friction device between said rollers for allowing one of them to rotate independent of the other as the loop or bight enlarges, substantially as set forth.

18. In a press for forming sheets of cotton and other materials into cylindrical bales, the combination of an endless belt, a portion of which partially surrounds the bale during its formation, means stationed at the entrance of said loop or bight for resisting the enlargement of said loop or bight, and means for opening said loop or bight for the removal of the finished bale, substantially as set forth.

19. In a press for forming sheets of cotton and other materials into cylindrical bales, the combination of an endless belt, a portion of which is formed into a loop or bight, two rollers to which said belt is positively connected, means for driving said belt, means for allowing one of said rollers to rotate faster than the other of said rollers, means for resisting the rotation of one of said rollers with respect to the other, and means for opening said loop or bight for the removal of the finished bale, substantially as set forth.

20. In a press for forming sheets of cotton and other materials into cylindrical bales, the combination of an endless belt, two rollers to which said belt is positively connected and between which the belt is formed into a loop or bight, means for driving one of said rollers faster than the other of said rollers, whereby said belt will be driven and said loop or bight will enlarge with the bale, and means for opening said loop or bight for the removal of the finished bale, substantially as set forth.

21. In a press for forming sheets of cotton and other materials into cylindrical bales, the combination of an endless belt, a portion of which is formed into a loop or bight which partially surrounds the bale during its formation, means stationed at the entrance of said loop or bight for resisting the enlargement of said loop, said resistance gradually increasing as the loop or bight enlarges, and means for opening said loop or bight for the removal of the finished bale, substantially as set forth.

22. In a press for forming sheets of cotton and other materials into cylindrical bales, the combination of an endless belt, two rollers to which said belt is positively connected and between which the belt is formed into a loop or bight, means for driving said belt, a friction device between said rollers for allowing one of them to rotate independent of the other as the loop or bight enlarges, and means for opening said loop or bight for the removal of the finished bale, substantially as set forth.

23. In a press for forming sheets of cotton and other materials into cylindrical bales, the combination of a suitable frame, a pair of swinging arms hinged to said frame at both ends thereof, a roller carried by each pair of swinging arms, a shaft mounted in said frame between said rollers, an idler on said shaft, a connection between said shaft and one of said rollers, and an endless belt passing over said rollers and idler and formed into a loop or bight between each of said rollers and said idler, substantially as set forth.

24. In a press for forming sheets of cotton and other materials into cylindrical bales, the combination of a suitable frame, rollers mounted in said frame, an endless belt carried on said rollers, said belt being formed into a plurality of loops or bights in each of which a cylindrical bale is formed, and means stationed at the entrance of said loops or bights for resisting the enlargement of the same, substantially as set forth.

25. In a press for forming sheets of cotton and other materials into cylindrical bales, the combination of an endless belt, two rollers to which said belt is positively connected, and means for driving one of said rollers faster than the other of said rollers, whereby said belt will be driven and said loops or bights will enlarge with the bale, substantially as set forth.

26. In a press for forming sheets of cotton and other materials into cylindrical bales, the combination of two supporting-rollers over which passes an endless belt, a portion of which is formed into two loops or bights, the space between said supporting-rollers constituting the entrance to said loops or bights, and means for driving one of said rollers faster than the other of said rollers, substantially as set forth.

27. In a press for forming sheets of cotton and other materials into cylindrical bales, the combination of two supporting-rollers over which passes an endless belt, a portion of which is formed into two loops or bights, the space between said rollers constituting the entrance to said loops or bights, means for positively driving said rollers, and differential connections between said rollers for allowing one of said rollers to rotate faster than the other of said rollers, as said loops or bights enlarge with the bales, substantially as set forth.

28. In a press for forming sheets of cotton and other materials into cylindrical bales, the combination of two supporting-rollers over which passes an endless belt, a portion of which is formed into two loops or bights, the space between said rollers constituting the entrance to said loop or bights, means for driving one of said rollers faster than the other of said rollers, and differential connections between said rollers for allowing one of said rollers to move independent of the other of said rollers, substantially as set forth.

29. In a press for forming sheets of cotton and other materials into cylindrical bales, the combination of an endless belt, a portion of which is formed into two loops or bights which partially surround the bales during their formation, and means stationed at the entrance of said loops or bights for resisting the enlargement of said loops or bights, said resistance gradually increasing as the loops or bights enlarge, substantially as set forth.

30. In a press for forming sheets of cotton and other materials into cylindrical bales, the combination of an endless belt, two rollers to which said belt is positively connected and between which the belt is formed into two loops or bights, means for driving said belt, and a friction device between said rollers for allowing one of them to rotate independent of the other as the loops or bights enlarge, substantially as set forth.

31. In a press for forming sheets of cotton and other materials into cylindrical bales, the combination of an endless belt, a portion of which is formed into two loops or bights, means for driving said rollers, whereby the belt will be driven, and a friction device between said rollers for allowing one of them to revolve independent of the other, whereby said loops or bights will be gradually enlarged, substantially as set forth.

32. In a press for forming sheets of cotton and other materials into cylindrical bales, the combination of an endless belt, a portion of which is formed into two loops or bights which partially surround the bales during their formation, a core stationed in each of said loops or bights on which the bales are formed, and means stationed at the entrance of said loops or bights for resisting the enlargement of said loops or bights, substantially as set forth.

33. In a press for forming sheets of cotton and other materials into cylindrical bales, the combination of an endless belt, a portion of which is formed into two loops or bights, a core stationed in each of said loops or bights on which the bales are formed, two rollers to which said belt is positively connected and between which the loops or bights are formed, and means for driving one of said rollers faster than the other of said rollers, whereby said belt will be driven and said loops or bights will enlarge with the bales, substantially as set forth.

34. In a press for forming sheets of cotton and other materials into cylindrical bales, the combination of an endless belt, a portion of which is formed into two loops or bights which surround the bales during their formation, a core stationed in each of said loops or bights on which the bales are formed, and means stationed at the entrance of said loop or bight for resisting the enlargement of said loops or bights, said resistance increasing as the loops or bights enlarge, substantially as set forth.

35. In a press for forming sheets of cotton and other materials into cylindrical bales, the combination of an endless belt, a portion of which is formed into two loops or bights, a core stationed in each of said loops or bights on which the bale is formed, two rollers to which said belt is positively connected and between which the loops or bights are formed, means for driving said belt, and a friction device between said rollers for allowing one of them to rotate independent of the other as the loops or bights enlarge, substantially as set forth.

36. In a press for forming sheets of cotton and other materials into cylindrical bales, the combination of an endless belt, a portion of which is formed into two loops or bights, means stationed at the entrance of said loops or bights for resisting the enlargement of said loops or bights, and means for opening said loops or bights for the removal of the finished bales, substantially as set forth.

37. In a press for forming sheets of cotton and other materials into cylindrical bales, the combination of an endless belt, two rollers to which said belt is positively connected, means for driving one of said rollers faster than the other of said rollers, whereby said belt will be driven, and said loops or bights will enlarge with the bales, and means for opening said loops or bights for the removal of the finished bales, substantially as set forth.

38. In a press for forming sheets of cotton and other materials into cylindrical bales, the combination of an endless belt, a portion of which is formed into two loops or bights which partially surround the bale during its formation, means stationed at the entrance of said loops or bights for resisting the enlargement of said loops or bights, said resistance gradually increasing as the loops or bights enlarge, and means for opening said loops or bights for the removal of the finished bales, substantially as set forth.

39. In a press for forming sheets of cotton and other materials into cylindrical bales, the combination of an endless belt, two rollers to which said belt is positively connected, means for driving said belt, a friction device between said rollers for allowing one of them to rotate independent of the other as the loops or bights
5 enlarge, and means for opening said loops or bights for the removal of the finished bales, substantially as set forth.

This specification signed and witnessed this 2d day of January, 1896.

FRANK L. DYER.

Witnesses:
ARCHIE G. REESE,
LEONARD HUNTRESS DYER.